US012801343B2

(12) United States Patent
Li et al.

(10) Patent No.: US 12,801,343 B2
(45) Date of Patent: Nov. 17, 2026

(54) CLOCK DOMAIN CROSSING QUEUE STRUCTURE

(71) Applicant: Shanghai Zhaoxin Semiconductor Co., Ltd., Shanghai (CN)

(72) Inventors: Zenghui Li, Xi'an City (CN); Qunyi Yang, Beijing (CN); Yang Jiao, Beijing (CN); Xiaofang Tang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 19/222,079

(22) Filed: May 29, 2025

(65) Prior Publication Data

US 2026/0169687 A1 Jun. 18, 2026

(30) Foreign Application Priority Data

Dec. 12, 2024 (CN) ......................... 202411830086.0

(51) Int. Cl.
*G06F 5/06* (2006.01)
*G06F 1/12* (2006.01)

(52) U.S. Cl.
CPC ................ *G06F 5/065* (2013.01); *G06F 1/12* (2013.01)

(58) Field of Classification Search
CPC ................................... G06F 5/065; G06F 1/12
See application file for complete search history.

(56) References Cited

U.S. PATENT DOCUMENTS

| | | | | |
|---|---|---|---|---|
| 7,573,770 | B1 * | 8/2009 | Zhang | G06F 5/06 365/221 |
| 7,810,489 | B2 * | 10/2010 | Liu | F24S 60/00 52/173.3 |
| 7,953,907 | B1 * | 5/2011 | Nguyen | G06F 11/0793 370/242 |
| 9,104,345 | B2 * | 8/2015 | Agrawal | G06F 5/12 |
| 10,168,731 | B2 * | 1/2019 | Kommrusch | G06F 1/08 |
| 2012/0051243 | A1 * | 3/2012 | Faye | H04W 48/18 370/252 |
| 2013/0132760 | A1 * | 5/2013 | Talupuru | G06F 1/08 713/400 |
| 2018/0267924 | A1 * | 9/2018 | Pagare | G06F 13/4068 |
| 2019/0317548 | A1 * | 10/2019 | Thong | G06F 1/12 |
| 2024/0171309 | A1 * | 5/2024 | Wei | G06F 11/1004 |
| 2024/0313781 | A1 * | 9/2024 | Gaide | H03K 19/17796 |
| 2025/0199566 | A1 * | 6/2025 | Liao | G06F 1/12 |

* cited by examiner

*Primary Examiner* — Henry Tsai
*Assistant Examiner* — Christopher A Daley
(74) *Attorney, Agent, or Firm* — McClure, Qualey & Rodack, LLP

(57) ABSTRACT

A clock domain crossing queue structure is provided. The clock domain crossing queue structure used to perform a clock domain crossing data transmission includes a clock domain crossing First In First Out (FIFO) and a first generating module. The clock domain crossing First In First Out is located in a slow clock domain and configured to synchronize combined signals of a plurality of signals corresponding to a plurality of data entries processed in the slow clock domain to a fast clock domain. The slow clock domain is a slower clock cycle of a read clock cycle and a write clock cycle and the fast clock cycle domain is a faster clock cycle of the read clock cycle and the write clock cycle. The first generating module is located in the fast clock cycle and configured to generate a first flag signal.

9 Claims, 7 Drawing Sheets

CLOCK DOMAIN CROSSING QUEUE STRUCTURE

CROSS REFERENCE TO RELATED APPLICATIONS

This Application claims priority of China Patent Application No. 202411830086.0, filed on Dec. 12, 2024, the entirety of which is incorporated by reference herein.

BACKGROUND OF THE INVENTION

Field of the Invention

The present invention relates to a digital circuit design, and in particular it relates to a Clock Domain Crossing queue structure.

Description of the Related Art

In digital circuit design, there is high demand for the ability to pass data from one clock domain to another asynchronous clock domain using a Clock Domain Crossing (CDC) queue. In related techniques, a Clock Domain Crossing queue based on Gray code counting is used to realize Clock Domain Crossing data transmission. However, for Clock Domain Crossing data transmission using a Clock Domain Crossing queue, it is only possible to push one data entry in one write clock cycle and pop one data entry in one read clock cycle. Thus, the bandwidth of the data transmission is limited by the slower clock cycle of the write clock cycle and the read clock cycle, and by the bit width of the Clock Domain Crossing queue.

The Clock Domain Crossing queue based on Gray code counting can be used in data transmission across clock domains with low bandwidth requirements, but it cannot be applied to data transmission across clock domains with high bandwidth requirements. Therefore, a Clock Domain Crossing queue that can be applied to the Clock Domain Crossing data transmission with high bandwidth is one of the urgent problems in the prior art that needs to be solved.

BRIEF SUMMARY OF THE INVENTION

In view of this, the present invention provides a Clock Domain Crossing queue structure that enables increased bandwidth for data transmission across clock domains.

A clock domain crossing queue structure is provided. The clock domain crossing queue structure used to perform a clock domain crossing data transmission includes a clock domain crossing First In First Out (FIFO) and a first generating module. The clock domain crossing First In First Out is located in a slow clock domain and configured to synchronize combined signals of a plurality of signals corresponding to a plurality of data entries processed in the slow clock domain to a fast clock domain. The slow clock domain is a slower clock cycle of a read clock cycle and a write clock cycle and the fast clock cycle domain is a faster clock cycle of the read clock cycle and the write clock cycle. The first generating module is located in the fast clock cycle and configured to generate a first flag signal indicating an empty/full state of the clock domain crossing queue based on a signal corresponding to a data entry transmitted in the fast clock domain and the combined signals synchronized from the clock domain crossing FIFO.

According to an embodiment of the present invention, the clock domain crossing queue structure further includes a first counting module, a synchronization module, a second counting module, and a second generating module. The first counting module is located in the fast clock domain and configured to perform counting on the signal to obtain a first count value. The synchronization module is located in the fast clock domain and configured to synchronize the first count value to the slow clock domain. The second counting module is located in the slow clock domain and configured to perform counting on the plurality of signals to obtain a second count value. The second generating module is configured to generate a second flag signal indicating an empty/full state of the clock domain crossing queue based on the second count value and the first count value synchronized from the fast clock domain.

According to an embodiment of the present invention, a width of the clock domain crossing FIFO is determined based on frequency difference between the read clock cycle and the write clock cycle, and bandwidth requirement for the clock domain crossing data transmission using the clock domain crossing queue structure.

According to an embodiment of the present invention, the bandwidth requirement is that when a bandwidth of data transmission for the read clock cycle is equal to a bandwidth of data transmission for the write clock cycle, the width of the clock domain crossing FIFO is equal to a sum of 1 and a multiple of the frequency difference of the slower clock cycle of the read clock cycle and the write clock cycle.

According to an embodiment of the present invention, the width of the clock domain crossing FIFO is equal to 2, 3, or 4.

According to an embodiment of the present invention, when the slow clock domain is the read clock cycle and the fast clock domain is the write clock cycle: the clock domain crossing FIFO synchronizes combined signals of a plurality of pop signals corresponding to a plurality of data entries popping within the read clock cycle to the write clock cycle; the first counting module counts a data entry pushing within the write clock cycle to obtain a write pointer as the first count value; the first generating module compares the write pointer with the combined signals synchronized from the read clock cycle to generate a full flag signal indicating that the clock domain crossing queue is full.

According to an embodiment of the present invention, when the slow clock domain is the read clock cycle and the fast clock domain is the write clock cycle: the synchronization module synchronizes the write pointer to the read clock cycle; the second counting module counts the plurality of pop signals to obtain a read pointer as the second count value; the second generating module compares the read pointer with the write pointer synchronized from the write clock cycle to generate an empty flag signal indicating that the clock domain crossing queue is empty and a flag signal indicating that the clock domain crossing queue is about to be empty.

According to an embodiment of the present invention, when the width of the clock domain crossing FIFO is N, the plurality of pop signals are N pop signals, and the second generating module is configured to increase the read pointer by M when M of the N pop signals are valid simultaneously. N is a positive integer greater than or equal to 2, and M is less than or equal to N.

According to an embodiment of the present invention, when the slow clock domain is the write clock cycle and the fast clock domain is the read clock cycle: the clock domain crossing FIFO synchronizes combined signals of a plurality of push signals corresponding to a plurality of data entries pushing within the write clock cycle to the read clock cycle;

the first counting module counts a data entry popping within the read clock cycle to obtain a read pointer; the first generating module compares the read pointer with the combined signals synchronized from the write clock cycle to generate an empty flag signal indicating that the clock domain crossing queue is empty.

According to an embodiment of the present invention, when the slow clock domain is the write clock cycle and the fast clock domain is the read clock cycle: the synchronization module synchronizes the read pointer to the write clock cycle; the second counting module counts the plurality of push signals to obtain a write pointer as the second count value; the second generating module compares the write pointer with the read pointer synchronized from the read clock cycle to generate a full flag signal indicating that the clock domain crossing queue is full and a flag signal indicating that the clock domain crossing queue is about to be full.

According to an embodiment of the present invention, when the width of the clock domain crossing FIFO is P, the plurality of push signals are P push signals, and the second generating module is configured to increase the write pointer by Q when Q of the P push signals are valid simultaneously. P is a positive integer greater than or equal to 2, and Q is less than or equal to P.

According to the clock domain crossing queue structure of the present invention, it is possible to transfer one data entry in the faster clock cycle of the read clock cycle and the write clock cycle, and to process multiple data entries in the slower clock cycle of the read clock cycle and the write clock cycle. Therefore, the use of the clock domain crossing queue structure of the present invention to carry out the clock domain crossing data transmission enables the bandwidth of the data transmission to be no longer limited by the slower clock cycle of clock domain crossing processing, and the processing performance of the system can be improved. The higher bandwidth of data transmission can be realized compared to the clock domain crossing queue based on the Gray code counting.

BRIEF DESCRIPTION OF THE DRAWINGS

The present invention can be more fully understood by reading the subsequent detailed description and examples with references made to the accompanying drawings.

DETAILED DESCRIPTION OF THE INVENTION

Various exemplary embodiments, features, and aspects of the present invention will be described in detail below with reference to the accompanying drawings. Identical marks in the accompanying drawings indicate elements that are functionally identical or similar. Although various aspects of the embodiments are illustrated in the accompanying drawings, it is not necessary to draw the accompanying drawings to scale unless otherwise noted.

The word "exemplary" is used herein exclusively to mean "used as an example, embodiment, or illustration". Any embodiment illustrated herein as "exemplary" need not be construed as superior or better than other embodiments.

In addition, numerous specific details are given in the specific embodiments below in order to better illustrate the present invention. It should be understood by those skilled in the art that the present invention can be implemented equally well without some of the specific details. In some examples, methods, means, components, and circuits that are well known to those skilled in the art are not described in detail in order to emphasize the main subject matter of the present invention.

Figure 1:
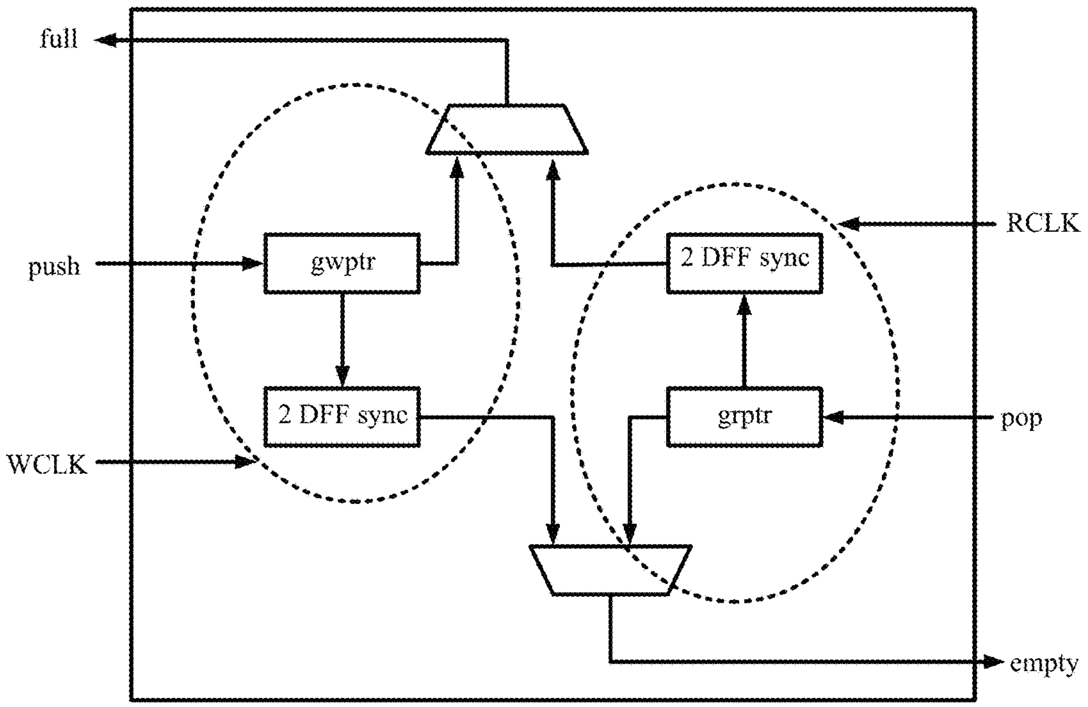
FIG. 1 shows a Clock Domain Crossing queue structure based on a pointer according to an embodiment of the present invention.

FIG. 1 shows a Clock Domain Crossing queue structure based on Gray code counting. As shown in FIG. 1, when a data entry is written in the write clock domain (WCLK), there exists a push signal in the write clock domain (WCLK). The Gray code counting is performed on the push signal to generate a Gray code write pointer (gwptr), and the counting result of the Gray code write pointer (gwptr) is synchronized to the read clock domain (RCLK) through synchronization of the two stage D-type flip flop (referred to as 2 DFF). Meanwhile, when a data entry is read in the read clock domain, there exists a pop signal in the read clock domain (RCLK). The Gray code counting is performed on the pop signal to generate a Gray code read pointer grptr, and the counting result of the Gray code read pointer grptr is synchronized to the write clock domain (WCLK) through the synchronization of the 2 DFF. In the write clock domain (WCLK), the Gray code write pointer (gwptr) is compared with the synchronized Gray code read pointer grptr to generate a full flag signal indicating that the queue across the clock domain is full. Accordingly, in the read clock domain (RCLK), the Gray code read pointer grptr is compared with the synchronized Gray code write pointer (gwptr) to generate an empty flag signal indicating that the queue across the clock domain is empty.

Since the Clock Domain Crossing queue based on the Gray code counting can only satisfy the requirement of pushing one data in one write clock cycle (1T WCLK) and popping one data in one read clock cycle (1T RCLK), the bandwidth of the data transmission using this Clock Domain Crossing queue is limited by the slower clock cycle of the read clock cycle (RCLK) and the write clock cycle (WCLK), and by the bit width of the Clock Domain Crossing queue. Therefore, the Clock Domain Crossing queue based on the Gray code counting cannot be applied to the Clock Domain Crossing data transmission with the high bandwidth demand.

For this reason, the present invention provides a Clock Domain Crossing queue structure capable of being applied to the Clock Domain Crossing data transmission with high bandwidth so that the bandwidth of the data transmission is no longer limited by the slow clock cycle during the Clock Domain Crossing processing. Therefore, the processing performance of the system will be improved, and the higher bandwidth of the data transmission can be realized compared to the Clock Domain Crossing queue based on the Gray code counting. The Clock Domain Crossing queue structure of the present invention will be described in detail below in conjunction with FIGS. 2 to 8.

Figure 2:
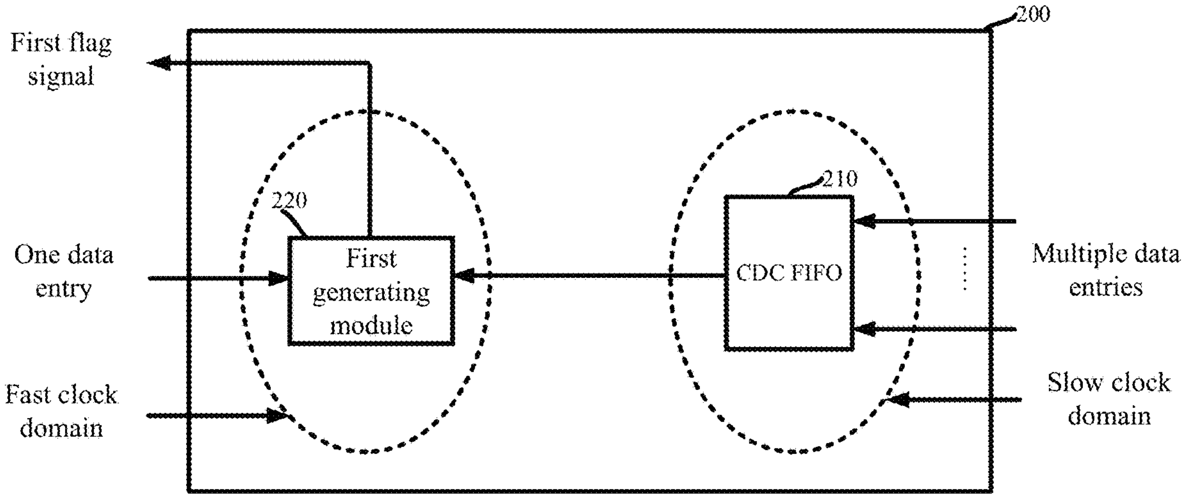
FIG. 2 is a block diagram of a Clock Domain Crossing queue structure according to an embodiment of the present invention.

FIG. 2 is a block diagram of a Clock Domain Crossing queue structure 200 according to an embodiment of the present invention. The Clock Domain Crossing queue structure 200 may be used to perform the Clock Domain Crossing data transmission (e.g., transfer data from fast clock domain to slow clock domain and transfer data from slow clock domain to fast clock domain). As shown in FIG. 2, the Clock Domain Crossing queue structure 200 may include a Clock Domain Crossing First In First Out (CDC FIFO) 210 and a first generating module 220. The CDC FIFO 210 is located in the slow clock domain and is used to synchronize combined signals of a plurality of signals corresponding to a plurality of data entries processed in the slow clock domain to the fast clock domain. The slow clock domain is the slower clock cycle of a read clock cycle and a write clock cycle, and the fast clock domain is the faster clock cycle of the read clock cycle and the write clock cycle. The first generating module 220 is located in the fast clock domain and is used to generate a first flag signal indicating the empty/full state of the Clock Domain Crossing queue based on a signal corresponding to a data entry transmitted in the fast clock domain and the combined signals synchronized from the CDC FIFO 210.

In the embodiment, the CDC FIFO 210 is introduced in the Clock Domain Crossing queue structure 200, and the CDC FIFO 210 can be used to synchronize the signals corresponding to the data entries in the slow clock domain to the fast clock domain while a data entry is being transmitted in the fast clock domain. In this way, the first generating module 220 is used to compare the data entry with the signals synchronized over in the fast clock domain to generate a flag signal (i.e., a first flag signal) for indicating the empty/full state of the Clock Domain Crossing queue.

Compared to FIG. 1, in which the 2 DFF is used to synchronize a signal corresponding to a data entry in the slow clock domain to the fast clock domain while a data entry is being transmitted in the fast clock domain, the present invention is capable of transmitting a data entry during the faster clock cycle of the read clock cycle and the write clock cycle and processing a plurality of data entries during the slower clock cycle of the read clock cycle and the write clock cycle. Therefore, in the embodiment, the Clock Domain Crossing queue structure used to realize the Clock Domain Crossing data transmission can enable the bandwidth of the data transmission to be no longer limited to the slow clock cycle during the Clock Domain Crossing processing. Thus, the processing performance of the system can be improved, and the higher bandwidth of the data transmission can be realized compared to the Clock Domain Crossing queue structure of FIG. 1.

Figure 3:
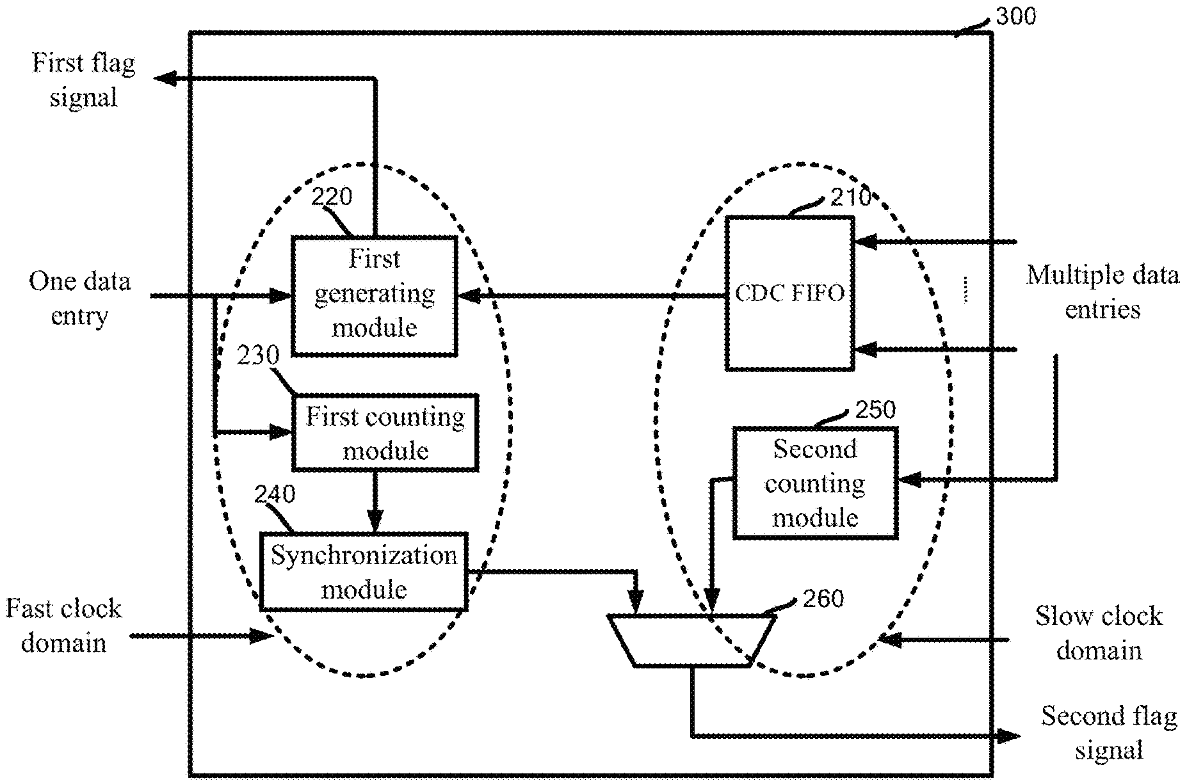
FIG. 3 is a block diagram of a Clock Domain Crossing queue structure according to an embodiment of the present invention.

FIG. 3 is a block diagram of a Clock Domain Crossing queue structure 300 according to an embodiment of the present invention. As shown in FIG. 3, the Clock Domain Crossing queue structure 300 additionally includes a first counting module 230, a synchronization module 240, a second counting module 250, and a second generating module 260 as compared to the Clock Domain Crossing queue structure 200 shown in FIG. 2. The additional modules of FIG. 3 will be explained in detail hereinbelow, and the CDC FIFO 210 and the first generating module 22 can be referred in the previous description of FIG. 2, which will not be repeated herein.

The first counting module 230 located in the fast clock domain is used to perform the Gray code counting on a signal corresponding to a data entry transmitted in the fast clock domain to generate a Gray code pointer, and use the generated Gray code pointer as a first count value. Next, the first count value is synchronized to the slow clock domain through the synchronization module 240 (e.g., through the synchronization of 2 or 3 DFF) located in the fast clock domain. Meanwhile, in the slow clock domain, the second counting module 250 is used to count how many signals correspond to the data entries described above to obtain a second count value. In this way, a second flag signal indicating the empty/full state of the Clock Domain Crossing queue can be generated using the second generating module 260 based on the second count value and the synchronized first count value. That is, the second generating module 260 compares the second count value with the synchronized first count value to generate a flag signal (i.e., the second flag signal) for indicating the empty/full state of the Clock Domain Crossing queue.

In a possible embodiment, the width of the CDC FIFO 210 is determined based on the frequency difference between the read clock cycle and the write clock cycle, and the bandwidth requirements for the Clock Domain Crossing data transmission using the Clock Domain Crossing queue structure.

In the embodiment, the width of the CDC FIFO 210 can be determined based on the frequency difference between the read clock cycle and the write clock cycle to meet the bandwidth requirements for data transmission. As a result, it is possible to dynamically adjust the number of data entries processed in the slower clock cycle of the read clock cycle and the write clock cycle to realize the Clock Domain Crossing data transmission with various high bandwidth requirements.

In a possible embodiment, the bandwidth requirement is that when the bandwidth of the data transmission for the read clock cycle is equal to the bandwidth of the data transmission for the write clock cycle, the width of the CDC FIFO 210 is equal to the sum of 1 and the multiple of the frequency difference of the slower clock cycle of the read clock cycle and the write clock cycle.

In the embodiment, the width of the CDC FIFO 210 may be determined based on the frequency difference between the read clock cycle and the write clock cycle to equalize the bandwidth of the data transmission for both the read clock cycle and the write clock cycle. For example, the frequency difference between the read clock cycle and the write clock cycle may be calculated. Next, the calculated frequency difference is a multiple of the frequency of the slower clock cycle of the two clock cycles. Finally, the multiple plus 1 is the width of the CDC FIFO 210. As another example, a ratio of the frequency of the faster of the two clock cycles to the frequency of the slower of the two clock cycles may be calculated, and the ratio is used as the width of the CDC FIFO 210.

Exemplarily, assuming that the bandwidth of the data transmission of the read clock cycle and the write clock cycle is equal, if the frequency of the write clock cycle is 200M and the frequency of the read clock cycle is 100M, the width of the CDC FIFO 210 will be 200M/100M=2. If the frequency of the write clock cycle is 150M and the frequency of the read clock cycle is 50M, the width of the CDC FIFO 210 will be 200M/50M=3. If the frequency of the write clock cycle is 200M and the frequency of the read clock cycle is 50M, the width of CDC FIFO 210 will be 200M/50M=4.

Figure 4:
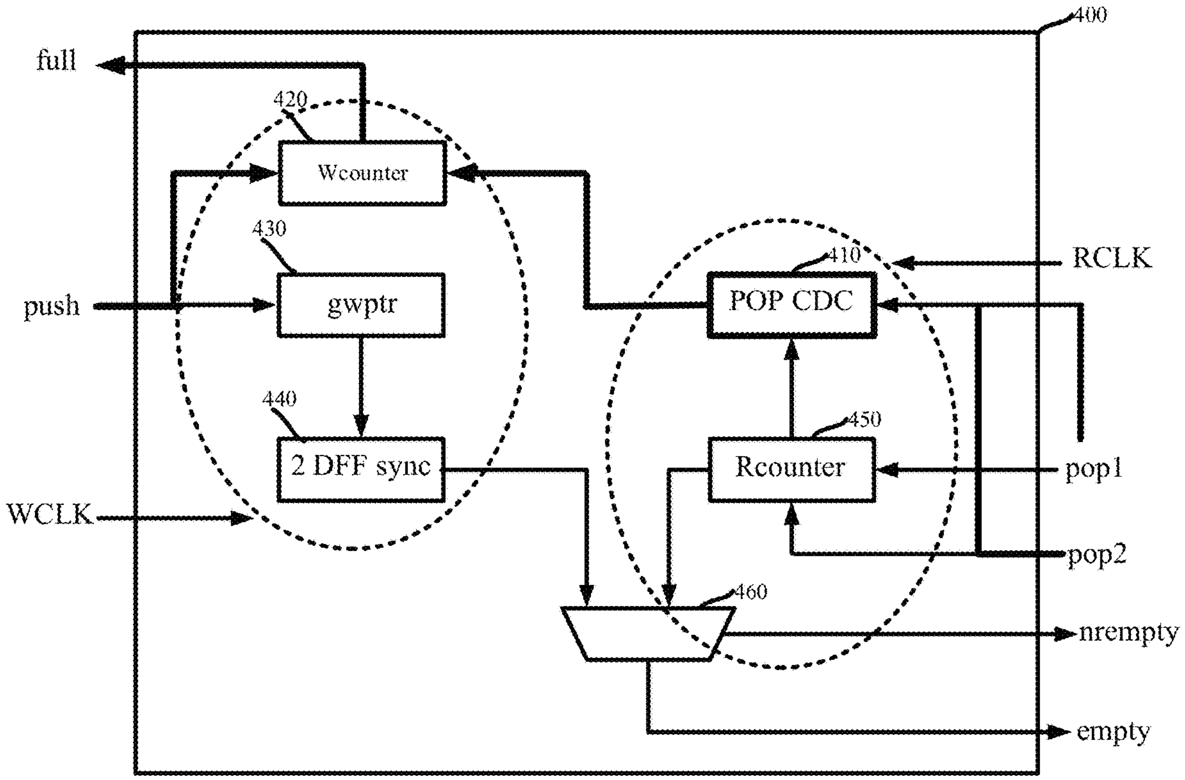
FIG. 4 is a block diagram of a Clock Domain Crossing queue structure according to an embodiment of the present invention.
Figure 5:
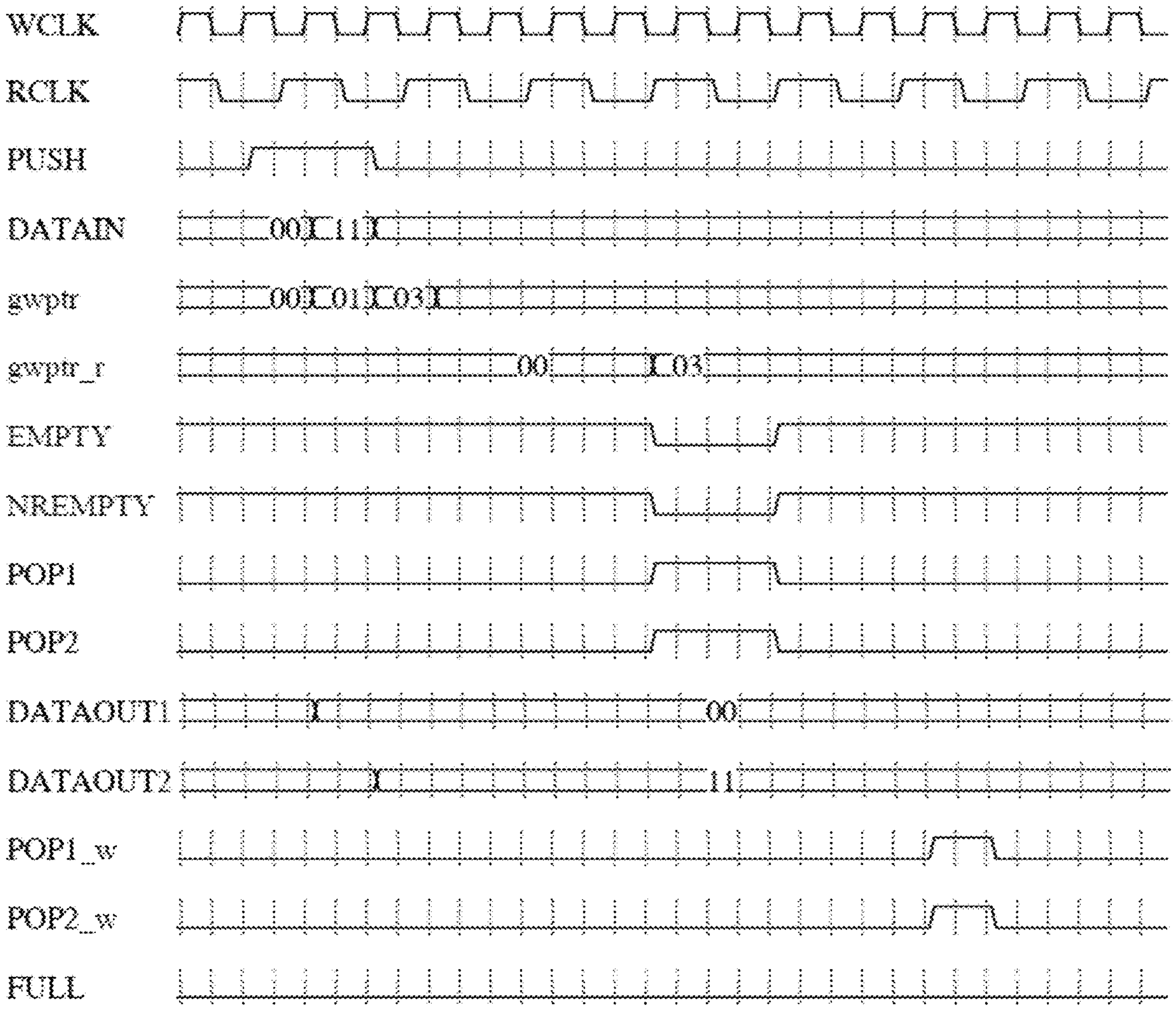
FIG. 5 is a timing diagram of a Clock Domain Crossing queue structure according to an embodiment of the present invention.

In cases where the slow clock domain is the read clock cycle and the fast clock domain is the write clock cycle, the Clock Domain Crossing queue structure 400 may include a POP_CDC 410, a write counter (Wcounter) 420, a gwptr 430, a 2 DFF sync 440, a read counter (Rcounter) 450, and a module 460, as shown in FIG. 4.

The POP_CDC 410 synchronizes the combined signals of multiple pop signals pop1 and pop2 corresponding to multiple data entries popping within a read clock cycle (RCLK) to a write clock cycle (WCLK). The gwptr 430 counts a push signal of a data entry pushing within a write clock cycle (WCLK) to obtain a write pointer (gwptr) as the first count value. The Wcounter 420 compares the push signal with the synchronized combined signals to generate a full flag signal indicating that the Clock Domain Crossing queue is full.

The 2 DFF sync 440 synchronizes the write pointer (gwptr) to the read clock cycle (RCLK). The Rcounter 450 counts the multiple pop signals pop1 and pop2 to obtain a read pointer as the second count value. The module 460 compares the read pointer with the synchronized write pointer (gwptr) to generate an empty flag signal indicating that the Clock Domain Crossing queue is empty and a flag signal nrempty indicating that the Clock Domain Crossing queue is about to be empty.

In the embodiment, when a data entry is written in the write clock domain (WCLK), there exists a push signal in the write clock domain (WCLK), and the gwptr 430 performs the Gray code counting on the push signal to generate a Gray code write pointer (gwptr). Next, the counting result of the Gray code write pointer (gwptr) is synchronized by the 2 DFF sync 440 to the read clock domain (RCLK). Meanwhile, when two data entries are read in the read clock domain (RCLK), there exists a pop signal pop1 and a pop signal pop2 in the read clock domain (RCLK). In the read clock domain (RCLK), the Rcounter 450 counts the read pointer grptr based on the pop signals pop1 and pop2. The module 460 compares the read pointer grptr with the synchronized write pointer (gwptr) to generate an empty flag signal indicating that the Clock Domain Crossing queue is empty and a flag signal nrempty indicating that the Clock Domain Crossing queue is about to be empty.

At the same time, in order to avoid the problem of Bit Error Rate (BER) caused by the simultaneous change of multi-bit encoding that may be brought about by the Gray code counting of the two pop signals pop1 and pop2 for 1 read clock cycle, the present invention is to write the two pop signals pop1 and pop2 into the POP_CDC 410 instead of performing the Gray code counting on the two pop signals. The POP_CDC 410 synchronizes the state of the pop signals pop1 and pop2 to the write clock domain (WCLK) as a record. In the write clock domain (WCLK), the Wcounter 420 compares the push signal with the state of the synchronized pop signals pop1 and pop2 to generate a full flag signal that indicates that the Clock Domain Crossing queue is full.

In a possible embodiment, the read pointer grptr is incremented by 2 when both pop signals pop1 and pop2 are valid. The read pointer grptr is incremented by 1 when one of the pop signals pop1 and pop2 is valid. The read pointer grptr is not incremented when neither the pop signals pop1 nor pop2 are valid. It should be understood that for the Clock Domain Crossing queue structure 400 shown in FIG. 4, the flag signal nrempty indicates that there is only one valid data entry in the Clock Domain Crossing queue. In particular, the pop signal pop1 is allowed to be valid when the Clock Domain Crossing queue is not empty, and the pop signal pop2 is allowed to be valid when the Clock Domain Crossing queue is not empty and is not about to be empty.

As can be seen by comparing FIG. 4 with FIG. 1, the Clock Domain Crossing queue structure of this embodiment uses a Clock Domain Crossing FIFO (i.e., POP_CDC 410 of FIG. 4) to synchronize the pop signals pop1 and pop2 from the read clock domain (RCLK) to the write clock domain (WCLK). The POP_CDC is a conventional asynchronous First In First Out (FIFO). The width and depth of the POP_CDC can be configured based on the frequency difference between WCLK and RCLK, and the bandwidth requirement. The width is described in the previous description and will not be repeated here.

For the Clock Domain Crossing queue structure 400 shown in FIG. 4, the width of the POP_CDC 410 is equal to 2, and the depth of the POP_CDC 410 is equal to the depth of the Clock Domain Crossing queue. The write clock of the POP_CDC 410 is the read clock cycle (RCLK) of the Clock Domain Crossing queue, and the read clock of the POP_CDC 410 is the write clock cycle (WCLK) of the Clock Domain Crossing queue. The input data entry of the POP_CDC 410 is a 2-bit signal {pop1, pop2} combining the pop signals pop1 and pop2 of the Clock Domain Crossing queue. The push signal of the POP_CDC 410 is a OR logic "pop1||pop2" of the pop signals pop1 and pop2. The pop signals of the POP_CDC 410 are non-empty signals of the Clock Domain Crossing queue, and the POP_CDC 410 outputs 2 bits of data entry (e.g., "00", "01", "10" and "11") simultaneously. The data entry "00" indicates that both pop1 and pop2 are invalid, the data entry "1" indicates that the pop1 is invalid but the pop2 is valid, the data entry "10" indicates that the pop1 is valid but the pop2 is invalid, and the data entry "11" indicates that both pop1 and pop2 are valid. As a result, as shown in the timing diagram of FIG. 5, the signals pop1_*w* and pop2_*w* of the write clock domain (WCLK) can be obtained. Therefore, it is possible to avoid the problem of BER caused by the simultaneous change of multiple bits encoding that may be brought about by the Gray code counting of 2 pop signals of the read clock domain.

According to the embodiment, in cases where the frequency of the write clock cycle (WCLK) is higher than the frequency of the read clock cycle (RCLK), the Clock Domain Crossing queue structure shown in FIG. 4 is used for the Clock Domain Crossing data transmission, which can carry out pushing one data entry in one WCLK and popping two data entries in one RCLK so that the bandwidth of the data transmission is no longer limited by the RCLK. In this way, the higher bandwidth of data transmission can be realized with fewer resources compared to the Clock Domain Crossing queue structure shown in FIG. 1.

Figure 6:
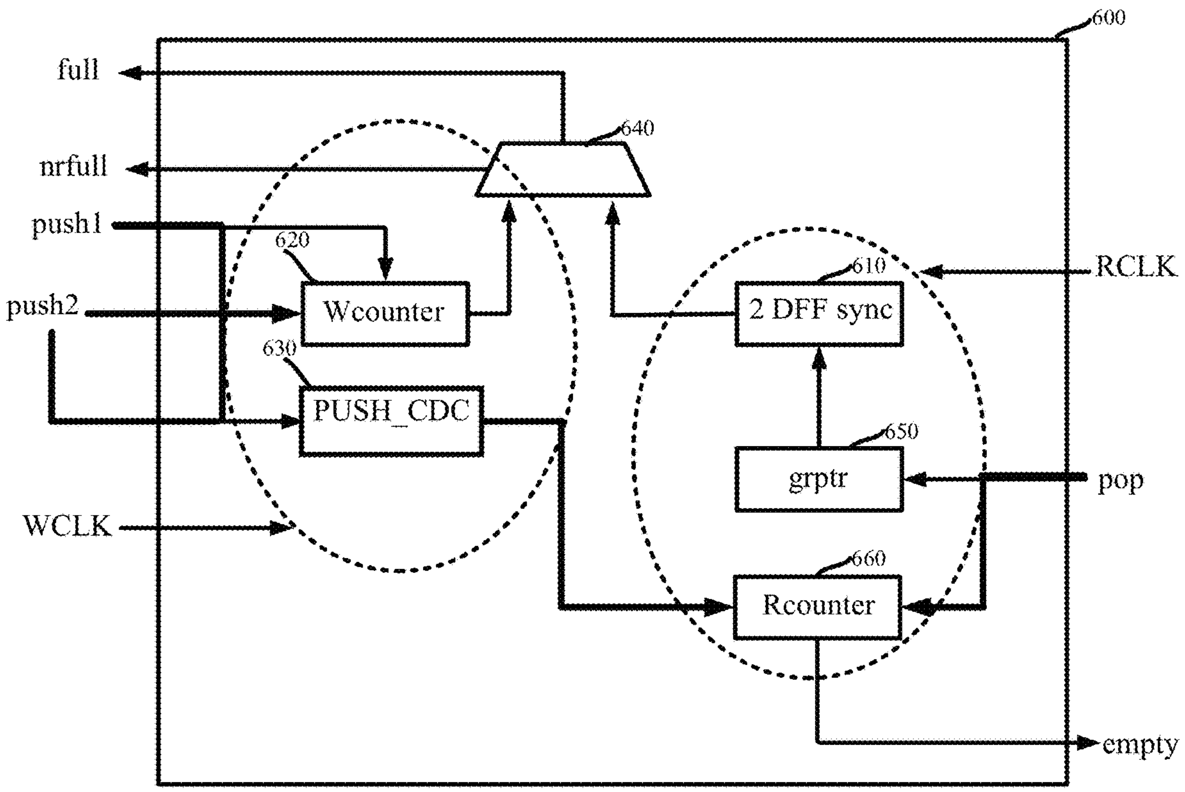
FIG. 6 is a block diagram of a Clock Domain Crossing queue structure according to an embodiment of the present invention.

In cases where the slow clock domain is the write clock cycle and the fast clock domain is the read clock cycle, as shown in FIG. 6, the Clock Domain Crossing queue structure 600 may include a PUSH_CDC 630, a write counter (Wcounter) 620, a grptr 650, a 2 DFF sync 610, a read counter (Rcounter) 660, and a module 640.

The PUSH_CDC 630 synchronizes combined signals of multiple push signals push1 and push2 corresponding to multiple data entries pushing within a write clock cycle (WCLK) to a read clock cycle (RCLK). The grptr 650 counts a pop signal of a data entry popping within a read clock cycle (RCLK) to obtain a read pointer grptr as a first count value. The Rcounter 660 compares the pop signal with the synchronized combined signals to generate an empty flag signal indicating that the Clock Domain Crossing queue is empty.

The 2 DFF sync 610 synchronizes the read pointer grptr to the write clock cycle (WCLK). The Wcounter 620 counts the multiple push signals push1 and push2 to obtain a write pointer as a second count value. The module 640 compares the write pointer with the synchronized read pointer grptr to generate a full flag signal indicating that the Clock Domain Crossing queue is full and a flag signal nrfull indicating that the Clock Domain Crossing queue is about to be full.

In the embodiment, when a data entry is read in the read clock domain (RCLK), there exists a pop signal in the read clock domain (RCLK), and the grptr 650 performs the Gray code counting on the pop signal to generate a Gray code read pointer grptr. Next, the counting result of the Gray code read pointer grptr is synchronized by the 2 DFF sync 610 to the write clock domain (WCLK). Meanwhile, when two data entries are written in the write clock domain (WCLK), there exist push signals push1 and push2 in the write clock domain (WCLK). In the write clock domain (WCLK), the Wcounter 620 counts the write pointer (gwptr) based on the push signals push1 and push2. The module 640 compares the write pointer (gwptr) with the synchronized read pointer grptr to generate a full flag signal indicating that the Clock Domain Crossing queue is full and a flag signal nrfull indicating that the Clock Domain Crossing queue is about to be full.

At the same time, in order to avoid the problem of BER caused by the simultaneous change of multiple bits encoding that may be brought about by the Gray code counting of the two push signals push1 and push2 for one write clock cycle (WCLK), the present invention is to write the two push signals push1 and push2 into the PUSH_CDC 630 instead of performing the Gray code counting on the two push signals. The PUSH_CDC 630 synchronizes the state of the push signals push1 and push2 to the read clock domain (RCLK) as a record. In the read clock domain (RCLK), the Rcounter 660 compares the pop signal with the state of the synchronized push signals push1 and push2 to generate an empty flag signal that indicates the Clock Domain Crossing queue is empty.

In a possible embodiment, the write pointer (gwptr) is incremented by 2 when both push signals push1 and push2 are valid. The write pointer (gwptr) is incremented by 1 when one of the push signals push1 and push2 is valid. The write pointer (gwptr) is not incremented when neither the push signals push1 nor push2 are valid. It should be understood that for the Clock Domain Crossing queue structure 600 shown in FIG. 6, the flag signal nrfull indicates that there is only one valid data entry in the Clock Domain Crossing queue. In particular, the push signal push1 is allowed to be valid when the Clock Domain Crossing queue is not empty, and the push signal push2 is allowed to be valid when the Clock Domain Crossing queue is not empty and is not about to be empty.

As can be seen by comparing FIG. 6 with FIG. 1, the Clock Domain Crossing queue structure of this embodiment uses a Clock Domain Crossing FIFO (i.e., PUSH_CDC 630 of FIG. 6) to synchronize the push signals push1 and push2 from the write clock domain (WCLK) to the read clock domain (RCLK).

For the Clock Domain Crossing queue structure 600 shown in FIG. 6, the width of the PUSH_CDC 630 is equal to 2, and the depth of the PUSH_CDC 630 is equal to the depth of the Clock Domain Crossing queue. The write clock of the PUSH_CDC 630 is the write clock cycle (WCLK) of the Clock Domain Crossing queue, and the read clock of the PUSH_CDC 630 is the read clock cycle (RCLK) of the Clock Domain Crossing queue. The input data entry of the PUSH_CDC 630 is a 2-bit signal {push1, push2} combining the push signals push1 and push2 of the Clock Domain Crossing queue. The pop signal of the PUSH_CDC 630 is an OR logic "push1||push2" of the push signals push1 and push2. The push signals of the PUSH_CDC 630 are non-full signals of the Clock Domain Crossing queue, and the PUSH_CDC 630 outputs 2 bits of data entry (e.g., "00", "01", "10" and "11") simultaneously. The data entry "00" indicates that both push1 and push2 are invalid, the data entry "01" indicates that the push1 is invalid but the push2 is valid, the data entry "10" indicates that the push1 is valid but the push2 is invalid, and the data entry "11" indicates that the push1 and the push2 are valid. As a result, the signals push1_*r* and push2_*r* of the read clock domain (RCLK) can be obtained. Therefore, it is possible to avoid the problem of BER caused by the simultaneous change of multiple bits encoding that may be brought about by the Gray code counting of 2 push signals of the write clock domain.

According to the embodiment, in cases where the frequency of the read clock cycle (RCLK) is higher than the frequency of the write clock cycle (WCLK), the Clock Domain Crossing queue structure shown in FIG. 6 is used for the Clock Domain Crossing data transmission, which can realize popping one data entry in one RCLK and pushing two data entries in one WCLK so that the bandwidth of the data transmission is no longer limited by the RCLK. In this way, the higher bandwidth of data transmission can be realized with fewer resources compared to the Clock Domain Crossing queue structure shown in FIG. 1.

Figure 7:
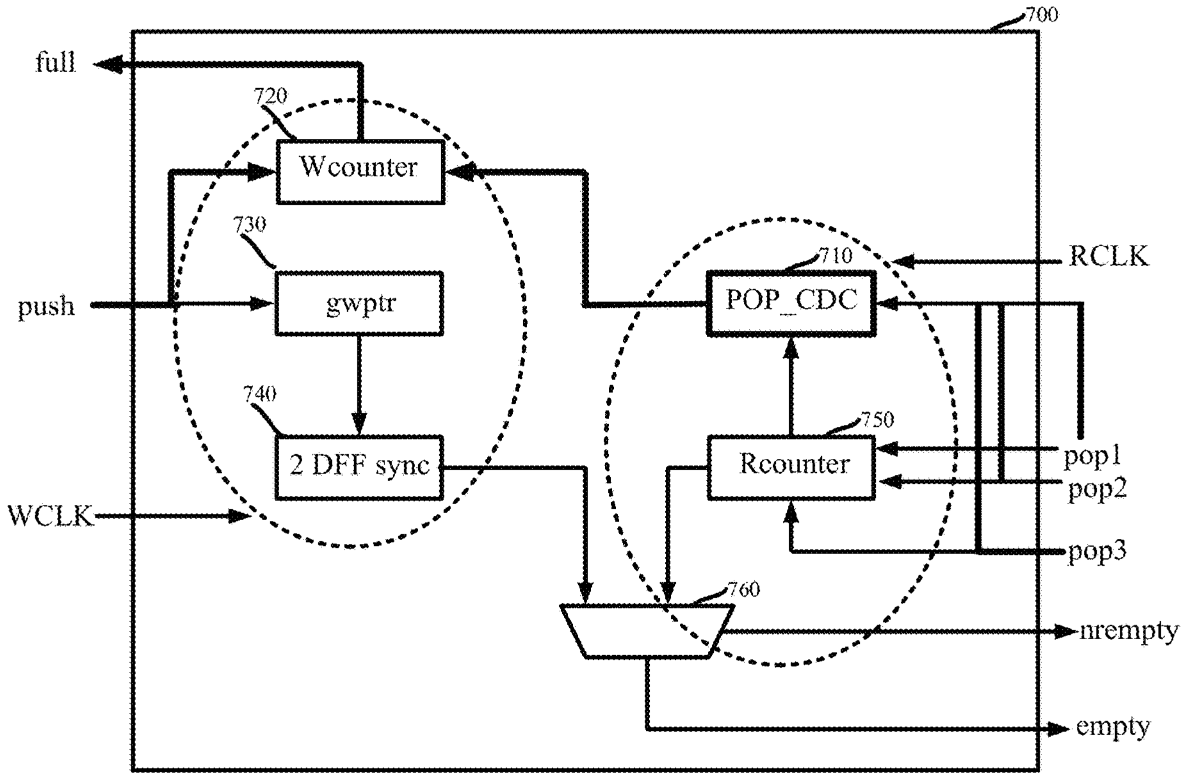
FIG. 7 is a block diagram of a Clock Domain Crossing queue structure according to an embodiment of the present invention.

FIG. 7 is a block diagram of a Clock Domain Crossing queue structure 700 according to an embodiment of the present invention. The difference between the Clock Domain Crossing queue structure 700 shown in FIG. 7 and the Clock Domain Crossing queue structure 400 shown in FIG. 4 is that the pop signals are increased from 2 to 3 (i.e., the width of the POP_CDC is changed from 2 to 3). For the specific illustration of the Clock Domain Crossing queue structure 700 can be referred in the previous description of FIG. 4 and will not be repeated here.

For the Clock Domain Crossing queue structure 700 shown in FIG. 7, the width of the POP_CDC 710 is equal to 3, and the depth of the POP_CDC 710 is equal to the depth of the Clock Domain Crossing queue. The write clock of the POP_CDC 710 is the read clock cycle (RCLK) of the Clock Domain Crossing queue, and the read clock of the POP_CDC 710 is the write clock cycle (WCLK) of the Clock Domain Crossing queue. The input data entry of the POP_CDC 710 is a 3-bit signal {pop1, pop2, pop3} combining the pop signals pop1, pop2, and pop3 of the Clock Domain Crossing queue. The push signal of the POP_CDC 710 is an OR logic "pop1||pop2||pop3" of the pop signals pop1, pop2, and pop3. The pop signals of the POP_CDC 710 are non-empty signals of the Clock Domain Crossing queue, and the POP_CDC 710 outputs 3 bits of data entry (e.g., "000", "001", "010", "011", "100", "101", "110", "111", "000") simultaneously. The data entry "000" indicates that the pop1, the pop2, and the pop3 are all invalid, the data entry "001" indicates that both the pop1 and the pop2 are invalid but the pop3 is valid, the data entry "100" indicates that the pop1 is valid but both the pop2 and the pop3 are invalid, and the data entry "111" indicates that the pop1, the pop2, and the pop3 are all valid.

According to the embodiment, in cases where the frequency of the write clock cycle (WCLK) is higher than the frequency of the read clock cycle (RCLK), the Clock Domain Crossing queue structure shown in FIG. 7 is used for the Clock Domain Crossing data transmission, which can realize pushing one data entry in one WCLK and popping three data entries in one RCLK so that the bandwidth of the data transmission is no longer limited by the RCLK. In this way, the higher bandwidth of data transmission can be realized with fewer resources compared to the Clock Domain Crossing queue structure shown in FIG. 1.

Figure 8:
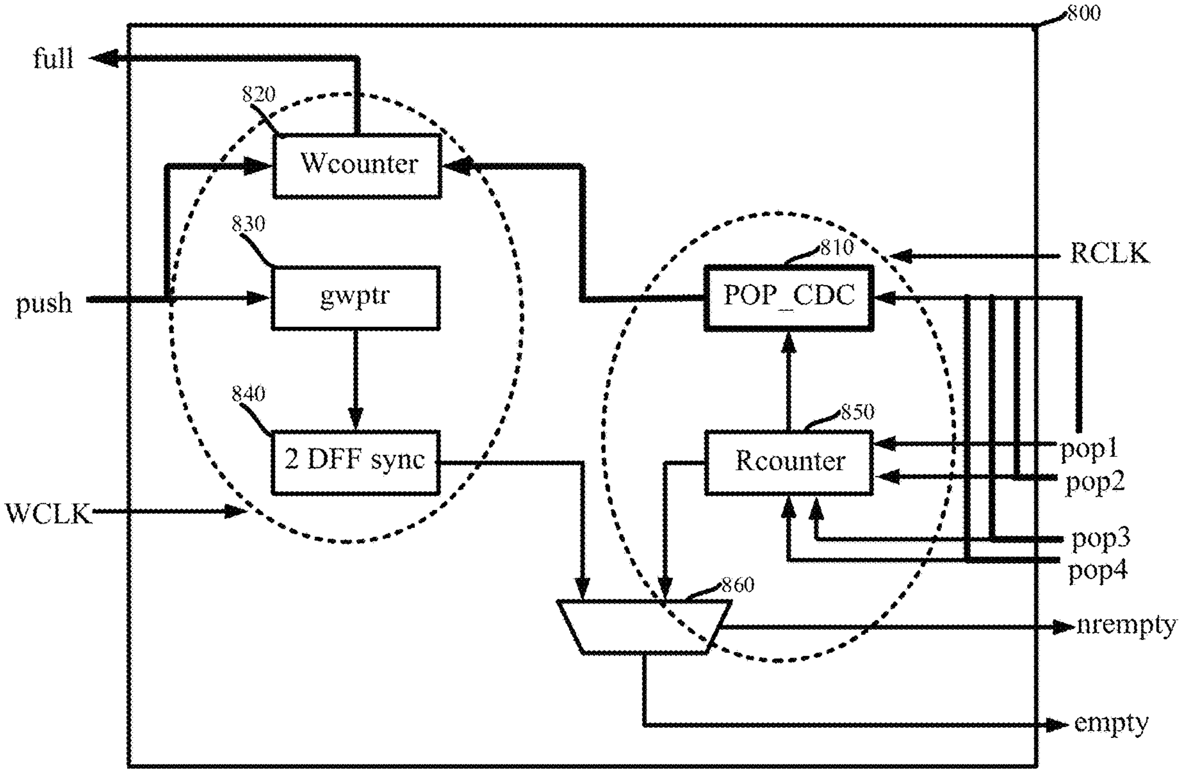
FIG. 8 is a block diagram of a Clock Domain Crossing queue structure according to an embodiment of the present invention.

FIG. 8 is a block diagram of a Clock Domain Crossing queue structure 800 according to an embodiment of the present invention. The difference between the Clock Domain Crossing queue structure 800 shown in FIG. 8 and the Clock Domain Crossing queue structure 400 shown in FIG. 4 is that the pop signals are increased from 2 to 4 (i.e., the width of the POP_CDC is changed from 2 to 4). For the specific illustration of the Clock Domain Crossing queue structure 800 can be referred in the previous description of FIG. 4 and will not be repeated here.

For the Clock Domain Crossing queue structure 800 shown in FIG. 8, the width of the POP_CDC 810 is equal to 4, and the depth of the POP_CDC 810 is equal to the depth of the Clock Domain Crossing queue. The write clock of the POP_CDC 810 is the read clock cycle (RCLK) of the Clock Domain Crossing queue, and the read clock of the POP_CDC 810 is the write clock cycle (WCLK) of the Clock Domain Crossing queue. The input data entry of the POP_CDC 810 is a 4-bit signal {pop1, pop2, pop3, pop4} combining the pop signals pop1, pop2, pop3, and pop4 of the Clock Domain Crossing queue. The push signal of the POP_CDC 810 is an OR logic "pop1||pop2||pop3||pop4" of the pop signals pop1, pop2, pop3, and pop4. The pop signals of the POP_CDC 810 are non-empty signals of the Clock Domain Crossing queue, and the POP_CDC 810 outputs 4 bits of data entry simultaneously.

According to the embodiment, in cases where the frequency of the write clock cycle (WCLK) is higher than the frequency of the read clock cycle (RCLK), the Clock Domain Crossing queue structure shown in FIG. 8 is used for the Clock Domain Crossing data transmission, which can realize pushing one data entry in one WCLK and popping four data entries in one RCLK so that the bandwidth of the data transmission is no longer limited by the RCLK. In this way, the higher bandwidth of data transmission can be realized with fewer resources compared to the Clock Domain Crossing queue structure shown in FIG. 1.

Various embodiments of the present invention have been described above, and the foregoing description is exemplary but not exhaustive, and is not limited to the disclosed embodiments. Without departing from the scope and spirit of the illustrated embodiments, many modifications and changes will be apparent to the person of ordinary skill in the art. The terminology used herein is chosen to best explain the principles, practical applications, or technical improvements to the marketplace of the embodiments, or to enable others of ordinary skill in the art to understand the embodiments disclosed herein.

What is claimed is:

1. A clock domain crossing queue structure, used to perform a clock domain crossing data transmission, wherein the clock domain crossing queue structure comprises:

a clock domain crossing First In First Out (FIFO), located in a slow clock domain and configured to synchronize combined signals of a plurality of signals corresponding to a plurality of data entries processed in the slow clock domain to a fast clock domain, wherein the slow clock domain is a slower clock cycle of a read clock cycle and a write clock cycle and the fast clock domain is a faster clock cycle of the read clock cycle and the write clock cycle; and a first generating module, located in the fast clock cycle and configured to generate a first flag signal indicating an empty/full state of the clock domain crossing queue based on a signal corresponding to a data entry transmitted in the fast clock domain and the combined signals synchronized from the clock domain crossing FIFO.

2. The clock domain crossing queue structure as claimed in claim 1, further comprising:

a first counting module, located in the fast clock domain and configured to perform counting on the signal to obtain a first count value;

a synchronization module, located in the fast clock domain and configured to synchronize the first count value to the slow clock domain;

a second counting module, located in the slow clock domain and configured to perform counting on the plurality of signals to obtain a second count value; and a second generating module, configured to generate a second flag signal indicating the empty/full state of the clock domain crossing queue based on the second count value and the first count value synchronized from the fast clock domain.

3. The clock domain crossing queue structure as claimed in claim 1, wherein a width of the clock domain crossing FIFO is determined based on frequency difference between the read clock cycle and the write clock cycle, and bandwidth requirement for the clock domain crossing data transmission using the clock domain crossing queue structure.

4. The clock domain crossing queue structure as claimed in claim 3, wherein the bandwidth requirement is that when a bandwidth of data transmission for the read clock cycle is equal to a bandwidth of data transmission for the write clock cycle, the width of the clock domain crossing FIFO is equal to a sum of 1 and a multiple of the frequency difference of the slower clock cycle of the read clock cycle and the write clock cycle.

5. The clock domain crossing queue structure as claimed in claim 3, wherein the width of the clock domain crossing FIFO is equal to 2, 3, or 4.

6. The clock domain crossing queue structure as claimed in claim 2, wherein when the slow clock domain is the read clock cycle and the fast clock domain is the write clock cycle:

the clock domain crossing FIFO synchronizes combined signals of a plurality of pop signals corresponding to a plurality of data entries popping within the read clock cycle to the write clock cycle;

the first counting module counts a data entry pushing within the write clock cycle to obtain a write pointer as the first count value; and the first generating module compares the write pointer with the combined signals synchronized from the read clock cycle to generate a full flag signal indicating that the clock domain crossing queue is full.

7. The clock domain crossing queue structure as claimed in claim 6, wherein when the slow clock domain is the read clock cycle and the fast clock domain is the write clock cycle:

the synchronization module synchronizes the write pointer to the read clock cycle;

the second counting module counts the plurality of pop signals to obtain a read pointer as the second count value; and the second generating module compares the read pointer with the write pointer synchronized from the write clock cycle to generate an empty flag signal indicating that the clock domain crossing queue is empty and a flag signal indicating that the clock domain crossing queue is about to be empty.

8. The clock domain crossing queue structure as claimed in claim 2, wherein when the slow clock domain is the write clock cycle and the fast clock domain is the read clock cycle:

the clock domain crossing FIFO synchronizes combined signals of a plurality of push signals corresponding to a plurality of data entries pushing within the write clock cycle to the read clock cycle;

the first counting module counts a data entry popping within the read clock cycle to obtain a read pointer; and the first generating module compares the read pointer with the combined signals synchronized from the write clock cycle to generate an empty flag signal indicating that the clock domain crossing queue is empty.

9. The clock domain crossing queue structure as claimed in claim 8, wherein when the slow clock domain is the write clock cycle and the fast clock domain is the read clock cycle:

the synchronization module synchronizes the read pointer to the write clock cycle;

the second counting module counts the plurality of push signals to obtain a write pointer as the second count value; and the second generating module compares the write pointer with the read pointer synchronized from the read clock cycle to generate a full flag signal indicating that the clock domain crossing queue is full and a flag signal indicating that the clock domain crossing queue is about to be full.

* * * * *